April 2, 1963  H. A. JEWETT  3,083,965
DIVING BOARD ASSEMBLY
Filed Nov. 18, 1954  9 Sheets-Sheet 1

INVENTOR
Harold A. Jewett.

FIG. 2-a

INVENTOR.

Harold A. Jewett.

April 2, 1963  H. A. JEWETT  3,083,965
DIVING BOARD ASSEMBLY

Filed Nov. 18, 1954  9 Sheets-Sheet 3

INVENTOR
Harold A. Jewett.

April 2, 1963

H. A. JEWETT 3,083,965

DIVING BOARD ASSEMBLY

Filed Nov. 18, 1954

INVENTOR

Harold A. Jewett.

April 2, 1963

H. A. JEWETT

3,083,965

DIVING BOARD ASSEMBLY

Filed Nov. 18, 1954

INVENTOR

Harold A. Jewett.

April 2, 1963

H. A. JEWETT 3,083,965

DIVING BOARD ASSEMBLY

Filed Nov. 18, 1954

INVENTOR
Harold A. Jewett.

April 2, 1963 H. A. JEWETT 3,083,965
DIVING BOARD ASSEMBLY
Filed Nov. 18, 1954 9 Sheets-Sheet 8

INVENTOR
Harold A. Jewett.

April 2, 1963

H. A. JEWETT 3,083,965

DIVING BOARD ASSEMBLY

Filed Nov. 18, 1954

INVENTOR

Harold A. Jewett.

United States Patent Office 3,083,965
Patented Apr. 2, 1963

3,083,965
DIVING BOARD ASSEMBLY
Harold A. Jewett, 5451 42nd St. NW.,
Washington 15, D.C.
Filed Nov. 18, 1954, Ser. No. 469,599
20 Claims. (Cl. 272—66)

This application is a continuation-in-part of S.N. 307,099, filed August 29, 1952 (now abandoned) which was a continuation-in-part of S.N. 120,135, filed October 7, 1949, now U.S.P. 2,675,728; also of S.N. 59,512, filed November 12, 1948, an irrelevant portion of which is now U.S.P. 2,675,730.

The invention relates particularly to diving boards for placement on structures bordering on or overlooking water, such as docks, shoulders of swimming pools, rafts, decks of boats, etc. More general aspects of the invention will appear below.

The central object of the invention is to reduce the space, especially from front-to-rear, required by diving board installations.

In conventional diving boards an elongate, rigid, plank-like structure—whether merely cut from wood or built up from laminations or glued-together sections of wood, or fabricated from metal or glass fiber, or otherwise fashioned—is anchored at its rear end in such a location that its front end overlies the water. Fulcrum means are provided rearwardly of the foot-contacted or take-off portion from which the diver springs, and resilience is supplied either by the board's inherent resistance to deformation or by auxiliary springs or both.

In any case and whether the board bends in use or merely pivots about its anchorage, maintenance of the diver's equilibrium requires that the motion of the take-off portion be approximately equalized. This calls for means insuring against excessive rotatory motion of said portion about any of its axes. Although analysis of such means in the ordinary case is extremely simple, a few words on the subject at this point will facilitate description of the invention later on.

Rotation of the take-off portion about its vertical axis is precluded by the anchorage at the rear end of the board, plus the latter's rigidity; rotation or tilt of the take-off portion about its front-to-rear axis is precluded by the board's fulcrum (the latter providing bilateral support of the board), plus rigidity of the board; and rotation of the take-off portion about its transverse axis is minimized by placement of the fulcrum a sufficient distance—commonly up to about six to eight or more feet—to the rear of said portion, plus rigidity of the board.

It is an object of the invention not only to reduce the front-to-rear distance between the take-off portion and the fulcrum, but also to reduce or eliminate the front-to-rear distance between the fulcrum and the usual anchorage of the bending type of board, and to economize on front-rear dimension of diving board assemblies in general. Achievement of this object makes feasible placement of diving boards alongside pools where shoulder space is at a premium, or on decks of small boats, etc., and cuts down the area of water surface which presently is pre-empted by the portion of the usual board which protrudes out over the water and consequently keeps cautious swimmers at a distance and boats from docking nearby.

The invention also has as objects, economy in the cost of diving board assemblies, facility in their installation, and the use of special materials for them such as corrosion-resistant, tempered or self-tempering steel for spring parts, or such other modern materials as may be desired, e.g., bamboo, laminated wood, fiber glass, synthetic resins or plastics (e.g., nylon) and/or aluminum alloys, all such materials being pre-shaped and pre-set into forms suitable for providing the needed resilience. Additionally, the invention has as objects novel adaptations of vibration or back-lash dampening structures, certain of said adaptations also being of novel utility for various resilient supports besides diving boards (e.g., stools, tractor seats, scales, etc.), and the provision of novel approaches, guards, housings and other structures serving to minimize or eliminate risk of injury to users or spectators.

Further objects will appear below.

The central—i.e., space-economizing—object of the invention is accomplished by introducing into the longitudinal axis of the board at least one rigid bend, bow, convolution or elbow (hereinafter referred to generically as elbow), with its shank extending either upwardly or downwardly, preferably in advance of the board's anchorage, and advantageously in advance of its fulcrum.

In the drawings (in respect to which all moving and bearing parts are to be understood as being optionally provided with rollers or the like, at bearing or rub points, also as being subject to modification to give them or enhance their individual replaceability; all lever, spring or other moving parts as provided, when needed, with suitable freedom of play and appropriate stop, anti-back-lash, damper and shock and/or sound-absorbing means; all parts as having fitting anchorages, guards and/or housings; all figures as being basically diagrammatic or schematic; and all expressions such as anterior, posterior, frontward, rearward, horizontal, lateral, longitudinal, etc., as being relative and approximate unless otherwise evident), to be more particularly described later on:

In FIGS. 1–a, 1–b, 1–c, and 1–d, which depict the presently pertinent essentials of the leverage action of diving boards generally:

FIG. 1–a is a diagrammatic side view of a conventional diving board of the type which bends during use;

FIG. 1–b is a diagrammatic plan view of the diving board of FIG. 1–a;

FIG. 1–c is a diagrammatic side view of a conventional hinged diving board of the type which does not bend during use but receives its resilience from an auxiliary source;

FIG. 1–d is a diagrammatic plan view of the diving board of FIG. 1–c.

FIG. 2–a, which is a formal copy of said FIG. C with part numbers and letters changed to correspond to those of said FIG. 2, is a perspective of a series of three of the diving boards of the invention wherein the shank which forms the rigid elbow of the invention depends from a rear portion of the board and extends into a guide sleeve that is in-built into wall structure of a swimming pool; said sleeve and said shank together constituting equalizer, stabilizer, and anti-rotative means for imparting an approximately translational quality to the reciprocatory movement of the board during use;

Referring to the drawings in detail:

Wherever appearing in FIGS. 1–a, 1–b, 1–c, 1–d, 2, 2–a, and 3 to 17: Numeral 1 designates the board (shown only as a solid line in the side views); numeral 2 the base on which it is installed; $p$ the board's anchor pivot; $pr$ and $pl$ the right and left side portions thereof; $f$ the board's fulcrum; $fr$ and $fl$ the right and left side portions thereof; W (plus its arrow in side views) the usual center of a diver's weight on the take-off portion, the latter being regarded as extending about a foot rearward from the front of the board; R (plus its arrow in side views) resilience contributed by conventional auxiliary springs if used; E the aforesaid rigid elbow, or the first one where there are a series, intervening between the board's take-off portion and its fulcrum; $Er$ and $El$ the right and left portions of said elbow where it is bifurcate; and C (depicted by long-and-short dash lines in the plan views) the vertical plane that bisects the front of the take-off portion and extends directly rearward through fulcrum $f$ and pivot $p$, said plane C being referred to below as the center plane.

The position or shape of the board at the instant prior to the diver's take-off is depicted by short dash lines.

In FIGS. 1–a and 1–b lever action of the ordinary diving board 1 about $f$ would cause its rear to fly upwardly, were it not held down by overlying anchor structure (understood) providing anchor pivot $p$, said means being affixed to base 2 by anchorage structure 3. Also, the movement of the board is such as to require slippage at $f$, wherefore the forward portion of the board is made to rest loosely on fulcrum-support 4, thus not forming a rigid or stiff elbow with it. These observations apply not only to the type of board shown in FIGS. 1–a and 1–b, but also to that shown in FIGS. 1–c and 1–d, wherein use is made of auxiliary springs that permit shifting of anchorage structure 3 forwardly to the point where pivot $p$ is in the same vertical plane with fulcrum $f$, the latter and pivot $p$ in such case constituting a hinge on which the board oscillates. It may be observed at this point that all lever-type diving boards, at least as a general thing, are hinged at their rears; the hinges being analogous to the elbow joint of the human forearm, which joint is generally called a fulcrum when the forearm is used as a lever, but which concurrently serves as, and may be also be called, an anchor pivot.

FIGS. 2 and 3–15 depict in outline form a variety of adaptations of the functional elements just referred to, in diving board assemblies having boards comprising the rigid elbow of the invention. Detailed exemplification of a representative number of said adaptations will be made in FIGS. 2–a and 18–38.

Figure 1A:
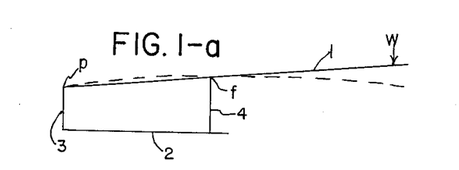
Figure 1B:
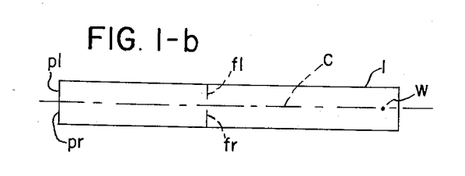
Figure 1C:
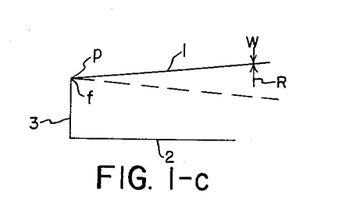
Figure 1D:
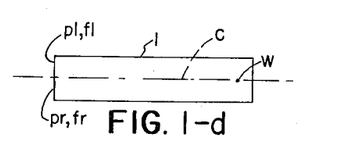
Figure 2:
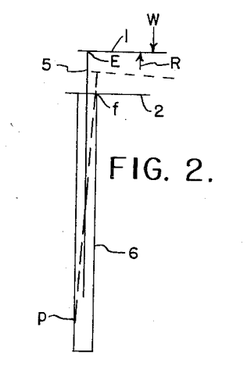
FIG. 2 is a diagrammatic side view of the embodiment of the invention exemplified by informal FIG. C of the amendment filed June 5, 1952, in aforesaid application S.N. 120,135, now Pat. 2,675,728 (all contents of which amendment, inclusive of its remarks section and informal figures, are intended to be in effect incorporated herein the same as the original specification and drawings of said S.N. 120,135 are)

In FIG. 2 elbow E forms a right angle with the board 1, shank 5 extending vertically downward to serve as a plunger-type equalizer. Thus, when weight W causes resilience R to yield, shank 5 slippingly impinges against $f$ and $p$ in guide sleeve 6 which is sunk in base 2. The slip at $f$ corresponds to that at $f$, $fl$ and $fr$ in FIGS. 1–a to 1–d and the confining action of pivot $p$ similarly corresponds to that in said FIGS. 1-a to 1-d. Since shank 5 advantageously bends no more than slightly in use. however, its lower tip is permitted to slip along pivot p. This action serves to minimize tipping of the board about its transverse axis; while shanks 5 and their sleeves 6 are given such widths (understood) as to prevent undue rotatory movement of the take-off portion of the board about either of its other axes.

Figure 2A:
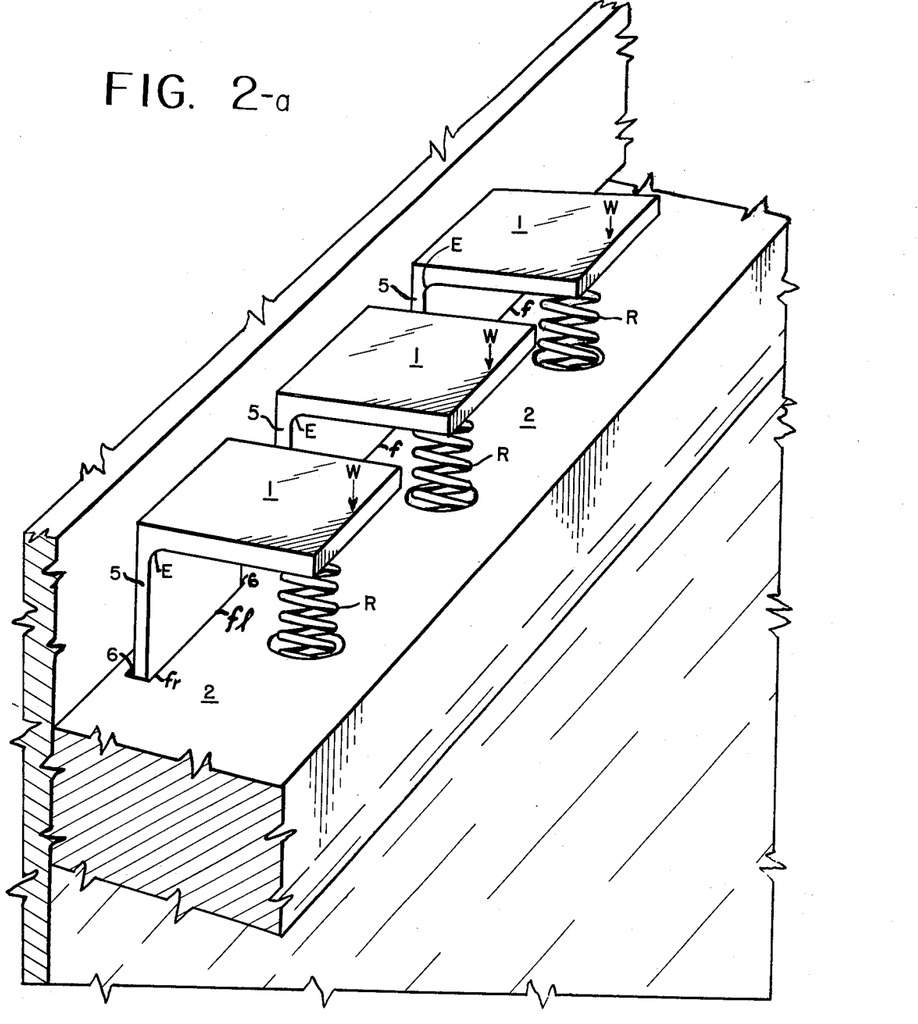

In FIG. 2-a the action of the parts is the same as in FIG. 2. That is, in the case of each of the three boards 1 shown in series, in FIG. 2-a, W is shown as slightly forward of resilience R, here depicted in the form of a spiral spring rising from a recess (unnumbered) in base 2. Shank 5, forming rigid elbow E with the take-off portion of the board, extends vertically downward into guide sleeve 6 in base 2, the latter being integral with wall structure of a swimming pool. Due to the width of shank 5 and its close but free fit within sleeve 6, any substantial rotatory movement or side-to-side tipping of the board during use is precluded.

Figure 3:
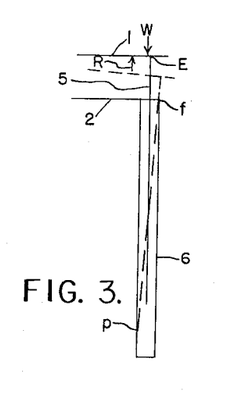
FIG. 3 is a variation of FIG. 2 wherein said shank depends from a forward portion of the board and its sleeve is juxtaposed alongside a wall of the pool.

In FIG. 3 the action of the parts is the same as in FIG. 2, except that shank 5 and sleeve 6 are disposed forwardly, thus adapting the assembly to installation in a pool with sleeve 6 juxtaposed alongside a wall thereof, rather than sunk in one of its shoulders.

Figure 4:
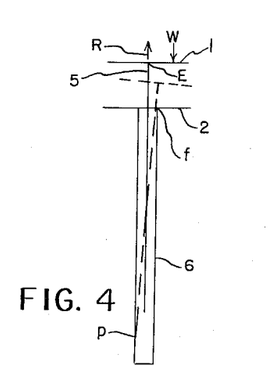
FIG. 4 is a further variation of FIG. 2 wherein said shank depends from a central portion of the board.
Figures 26, 27, 28, 29, 37, 38:
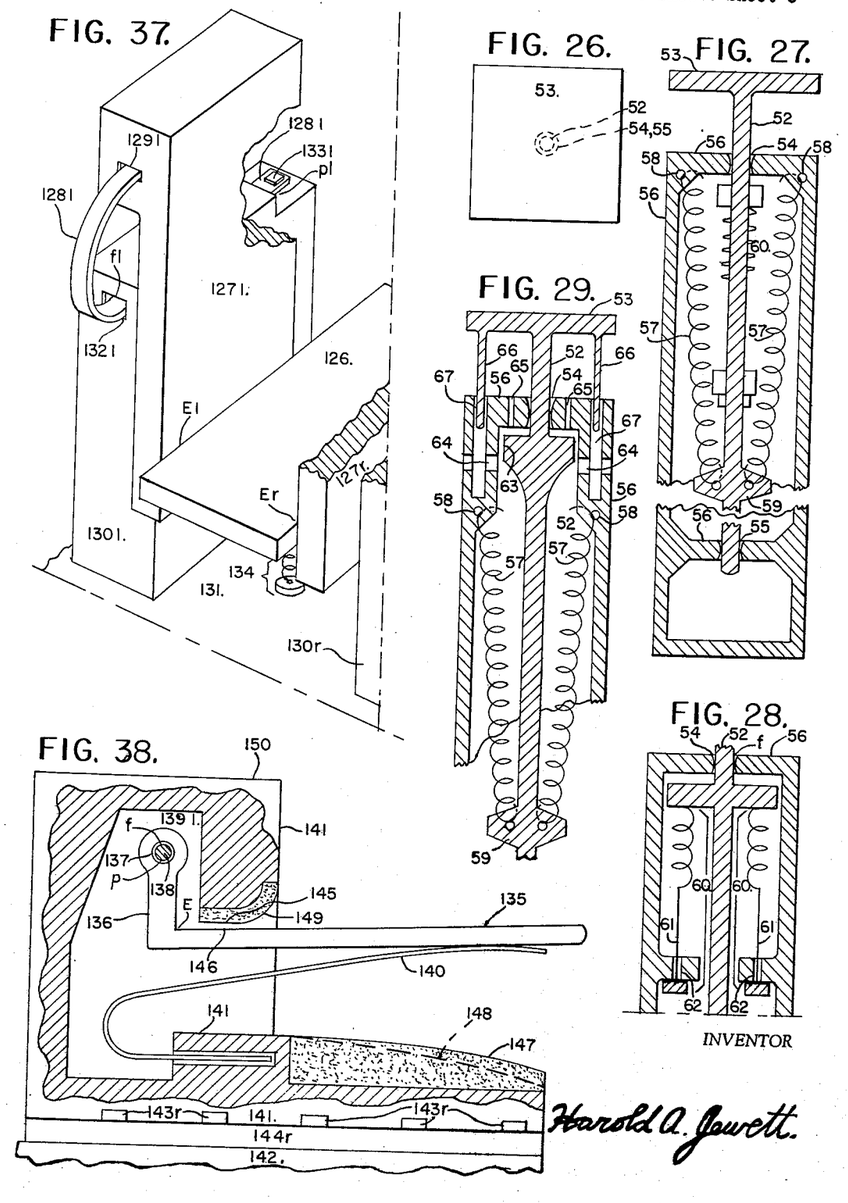
FIG. 26 is a plan of an embodiment of the species of FIG. 4.
FIG. 27 is a sectional front elevation detail of the embodiment of FIG. 26, showing coil spring means for imparting resilience to the board and further coil spring means for dampening back-lash as well as preventing rotative motion of the board during use.
FIG. 28 is a sectional side elevation detail of a portion of FIG. 27.
FIG. 29 is a variation of FIG. 27 wherein said last mentioned coil spring means are omitted and alternative means are shown for serving their said functions.
FIG. 37 is a perspective of a portion of an assembly embodying the species of FIG. 9.
FIG. 38 is a side elevation, partly in section, of an embodiment of the species of FIG. 13.

In FIG. 4 the action of the parts again is as in FIG. 2, except that equalizer shank 5 depends from the center of the horizontal portion of the board 1, R bears upwardly about or adjacent said center, and shank 5 may be merely a stem of small width or cross-section (e.g. cylindrical), in which case use of auxiliary stabilizing structures such as depicted in FIGS. 27-29 will be in order.

Figure 5:
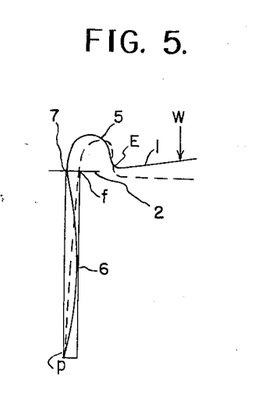
FIG. 5 is still another variation of FIG. 2 wherein said shank extends upwardly from said elbow and then is convoluted to extend vertically downward into, and rest on the bottom of its sleeve; said shank bending during use and auxiliary spring means such as appearing in FIG. 2–a consequently being omitted.

In FIG. 5 shank 5 extends upwardly from elbow E before turning downward into sleeve 6. This provides for increased spring action per unit of front-to-rear dimension, besides facilitating lowering of the take-off portion of the board 1 to such a level that a diver of average weight will receive a forward component of propulsion at the instant of take-off. Also, since the lower tip of shank 5 rests on the bottom of sleeve 6 at all times, the sleeved portion of the shank bends during use while slippingly bearing against fulcrum f. Although bending of said sleeved portion is not essential to the generic practice of the FIG. 5 embodiment of the invention, or variations thereof, it is advantageous; and species providing for it are presently preferred to those in which the anchor pivot p of shank 5 might be raised to the level of the mouth 7 of the sleeve 6 so as to coincide with fulcrum f, in which case there would be no bending of any sleeved portion of the shank at all.

Figure 6:
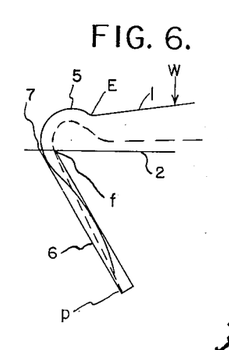
FIG. 6 is a variation of FIG. 5 wherein said shank and its sleeve are somewhat shortened and are disposed at a forward angle with the vertical.
Figure 7:
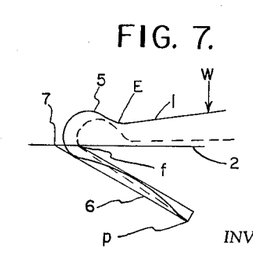
FIG. 7 is a variation of FIG. 6 wherein said shank and its sleeve are further shortened and disposed at a greater forward angle with the vertical.

In FIGS. 6 and 7 the situation is essentially the same as in FIG. 5, except that sleeve 6 is shown as progressively shortened and less vertically disposed.

It will be noted that in each of FIGS. 5-7 the bending of the sleeved portion of the shank is analogous to the bending of the f to p portion of the board 1 in FIG. 1-a; while the bending of the E to f portion of the board 1 in FIGS. 5-7 is analogous to the bending of the W to f portion of the board 1 in said FIG. 1-a. Similarly analogous bending will occur in the embodiments of FIGS. 8-12, 14-15, 30-34 and 37, described below.

Figure 8:
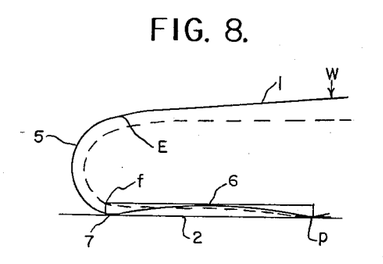
FIG. 8 is a variation of FIG. 7 wherein said shank and its sleeve are somewhat lengthened and disposed to extend horizontally forward, and wherein the sleeve is open at both ends.

In FIG. 8 the situation is essentially the same as in FIG. 7 except that sleeve 6 extends horizontally frontwardly and the portion of shank 5 posterior to elbow E is shown as optionally containing no convolution that extends upwardly from E. Here again the shank could be tightly anchored at the locus of the mouth 7 of the sleeve, but it is preferred to permit bending within the sleeve as shown. In addition, a small amount of horizontal slip, as well optionally as slight vertical play, may be permitted at pivot p if desired.

Figures 9, 10:
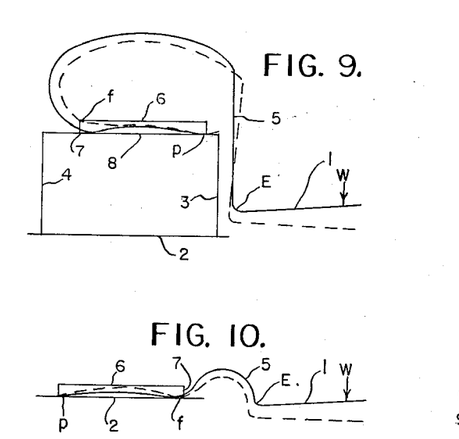
FIG. 9 is a variation of FIG. 8 wherein said shank and its sleeve are again somewhat shortened and placed in an elevated position, and wherein the portion of said shank which extends upwardly from said elbow is considerably lengthened.
FIG. 10 is a further variation of FIG. 8 wherein said shank extends upwardly from said elbow and then is convoluted to extend horizontally rearward into its sleeve.

FIG. 9 differs essentially from FIG. 8 in the placement of the sleeve 6 on an elevated portion 8 of base 2, plus the substantial lowering of the take-off portion of the board 1 below the level of said portion 8 whereby the forward component of propulsion referred to above in connection with FIG. 5 is enhanced. As will be apparent e.g. from FIGS. 31-34, 37, 11 and 15, structure such as said portion 8 and associated parts intervening between E and it can be made bifurcate, so as to leave a central passageway at an appropriate level for the diver's use in stepping upon the board.

Figure 11:
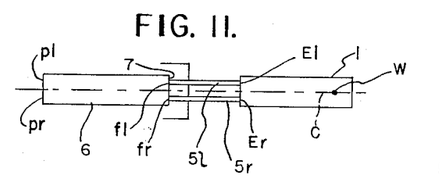
FIG. 11 is a plan of FIG. 10 wherein said shank is bifurcate.

The embodiment of the invention depicted in FIGS. 10-11, while not presently preferred, exemplifies the inclusion of the rigid elbow of the invention, its optional bifurcation in symmetrical relationship to center plane C, and the optional lowering of the take-off portion, in a board otherwise essentially similar to that shown in FIGS. 1-a and 1-b. While said elbow and the convolution of its shank 5 between E and f contribute a degree of economy in overall front-to-rear dimension of the assembly, the rearward rather than frontward disposition of the sleeve 6 greatly diminishes said economy, as compared with the degree in which it is present in embodiments such as those of FIGS. 2-9.

Figure 12:
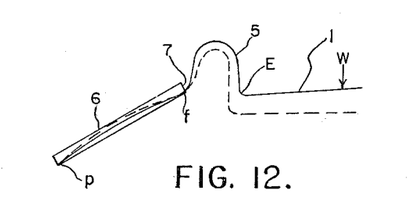
FIG. 12 is a variation of FIG. 10 wherein said shank and its sleeve are slopingly disposed at a rearward angle with the vertical.

In FIG. 12 a start toward increasing of said economy is effected by disposing the sleeve 6 at a downward angle of about thirty degrees. Ordinarily, however, such downward angle will be increased to at least forty-five or sixty degrees, or better, seventy-five or ninety degrees, in order further to increase said economy.

Figure 13:
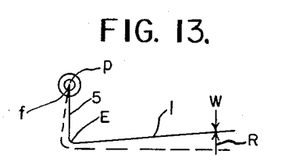
FIG. 13 is a variation of FIG. 9 wherein said sleeve is omitted and said shank is fore-shortened so as to non-bendingly reciprocate about a fulcrum located above said elbow, resilience being imparted to the board by auxiliary spring means.

The embodiment of FIG. 13 is similar to the assembly shown in FIGS. 1-c and 1-d, save only for the presence of the novel elbow E and its downwardly extending shank 5 the advantages of which have already been pointed out.

Figure 14:
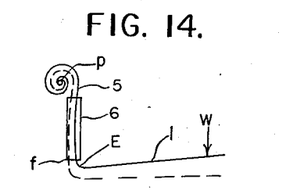
FIG. 14 is a variation of FIG. 13 wherein said auxiliary spring means is omitted and said shank bends during use—its bending being confined within an upwardly disposed sleeve; also wherein said shank comprises a coiled portion whose inner end is secured to said fulcrum.
Figure 15:
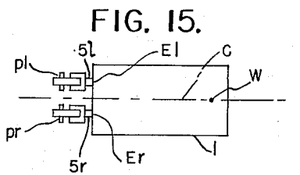
FIG. 15 is a plan of FIG. 14 wherein said shank and its coil portion are bifurcate.

The embodiment of FIGS. 14-15 is similar to that of FIG. 13 except that auxiliary resilience R is omitted, shank 5 is made of spring material, and said shank is anchored tightly rather than rotatively at P. Hence, the functioning of the parts in use becomes generally similar to that in FIG. 5, except that sleeve 6 extends upwardly rather than downwardly and shank 5 is supported from above rather than below.

In connection with the aforesaid bifurcation of the parts intervening between elbow E and fulcrum f in various embodiments of the invention, it may be observed that the bifurcations may be further subdivided to any desired degree, e.g., subdivision of shanks 5 of FIGS. 5-15 into, say, four, six, eight or ten or more would minimize risk of injury, should one such portion give way during use. To the same end, laminated leaf spring materials and designs known to workers in the art of springs, e.g., for vehicles, can be adapted for use in said shank portions. And in any case it will be advantageous to make the distribution of said portions symmetrical in respect to the center plane C, so as to achieve good balance and approximate evenness of drop of the take-off portion of the board 1 during use.

Figure 16:
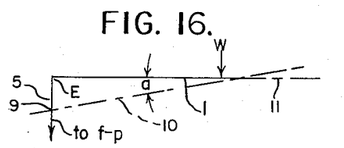
FIG. 16 is a side view analytical diagram identifying a certain dihedral angle referred to hereinafter in defining the invention, said angle being shown as downward.
Figure 17:
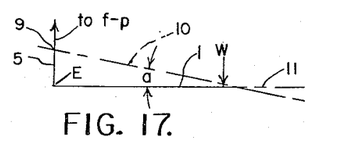
FIG. 17 is a variation of FIG. 16 wherein said angle is shown as upward.

The purpose of FIGS. 16 and 17 is to illustrate the fact that in the preferred embodiments of the invention (considering the board to be in its up position) shank 5, in extending either downwardly from elbow E as in FIG. 16 or upwardly from it as in FIG. 17, passes, before reaching juxtaposition with anchor pivot p, and preferably before reaching juxtaposition with fulcrum f, through at least one point that lies in a sloping plane that includes the upper front boundary of the take-off portion of the board and makes a dihedral angle of at least five (advantageously ten, fifteen, twenty-five or even up to forty, sixty, seventy-five or more) degrees with the rearwardly extending horizontal plane that also includes said upper front boundary. In FIGS. 16 and 17 such a point is designated 9, such a sloping plane 10, such a horizontal plane 11 (the board 1 happening to coincide with it in said figures but not necessarily doing so in practice), and such a dihedral angle a.

Re-stating the substance of the preceding paragraph, it may be pointed out that said shank 5 of FIGS. 16 and 17 must have sufficient vertical i.e., upright component of direction to intersect, at a locus in advance of said anchor pivot or said fulcrum as the case may be, a sloping plane that passes through said upper front boundary and forms a dihedral angle of at least 5 degrees (or whichever of the other aforesaid choices of degrees may be selected) with a horizontal plane which also passes through said upper front boundary.

In the preceding paragraph shank 5 is referred to as passing through a designated point "before reaching juxtaposition with fulcrum $f$." The significance of the words, "before reaching," as well as of a number of related expressions used herein (e.g., "anterior," "posterior," "intervenes," "intermediate," "in advance of," "pre-fulcrum," "post-fulcrum," etc.) can readily be visualized by placing a pencil point at the start of line 1 (just to the right of W on any of side elevational FIGS. 2–10 and 12–14) and moving the point along line 1. Each portion of the line traversed is "anterior" to each untraversed portion, and each untraversed portion is "posterior" to each traversed portion. Thus, when the pencil point reaches E on any of said figures, it will not yet have reached juxtaposition with $f$, wherefore E is referred to as located "in advance of" $f$, or "pre-$f$," or "intermediate" said starting point and $f$, or is said to "intervene" between them.

It will be noted that in each of FIGS. 2–9 e.g., some pre-fulcrum portions of line 1 are in fact farther rearward than $f$. Thus, when the pencil point reaches the lead line for 5 on FIG. 8 it will be considerably farther rearward than $f$, though by the above definitions of terms it will nevertheless be anterior to $f$, in advance of $f$, and at a locus intermediate, i.e. intervening between, W and $f$.

By the same token, as soon as the pencil point passes $f$ and continues toward $p$, all portions of line 1 then traversed are "post-$f$," even though they be—as e.g. in FIGS. 6–9 they in fact are—farther frontward than $f$. In other words, the portion of line 1 traversed by the pencil point is a "post-fulcrum" continuation of the "pre-fulcrum" portion of the line, and as such extends from $f$ to $p$ or beyond.

The same explanation applies of course in regard to "pre-anchor pivot" portions of lever-type diving boards, as well as to "post-anchor pivot" portions if any be present.

The pencil point test described in the preceding four paragraphs may equally well be applied reversely, so to speak, by placing the pencil point initially at the anchor pivot $p$ in any of said side elevational FIGS. 2–10 and 12–14, and then moving it outwardly along line 1 to the other end of said line. All portions of said line traversed by the pencil point in so doing are included within the expression "outwardly of" the anchor pivot, or "outwardly of" the means furnishing it, as that expression is used herein and in the claims.

Throughout FIGS. 18–38, about to be described in detail, alphabetical symbols when used will have the same significance as already explained in the discussion of FIGS. 1–$a$ to 17. Thus, e.g., whenever a symbol on a drawing is followed by $r$ or $l$, such letter will designate the right or left portion, respectively, of the member identified by the symbol, or the right or left counterpart, respectively, of a pair of members so identified.

Since FIGS. 18–25 all exemplify the species of FIG. 3, like numerals will be used to designate like or closely analogous parts in them.

Figures 18, 19, 20:
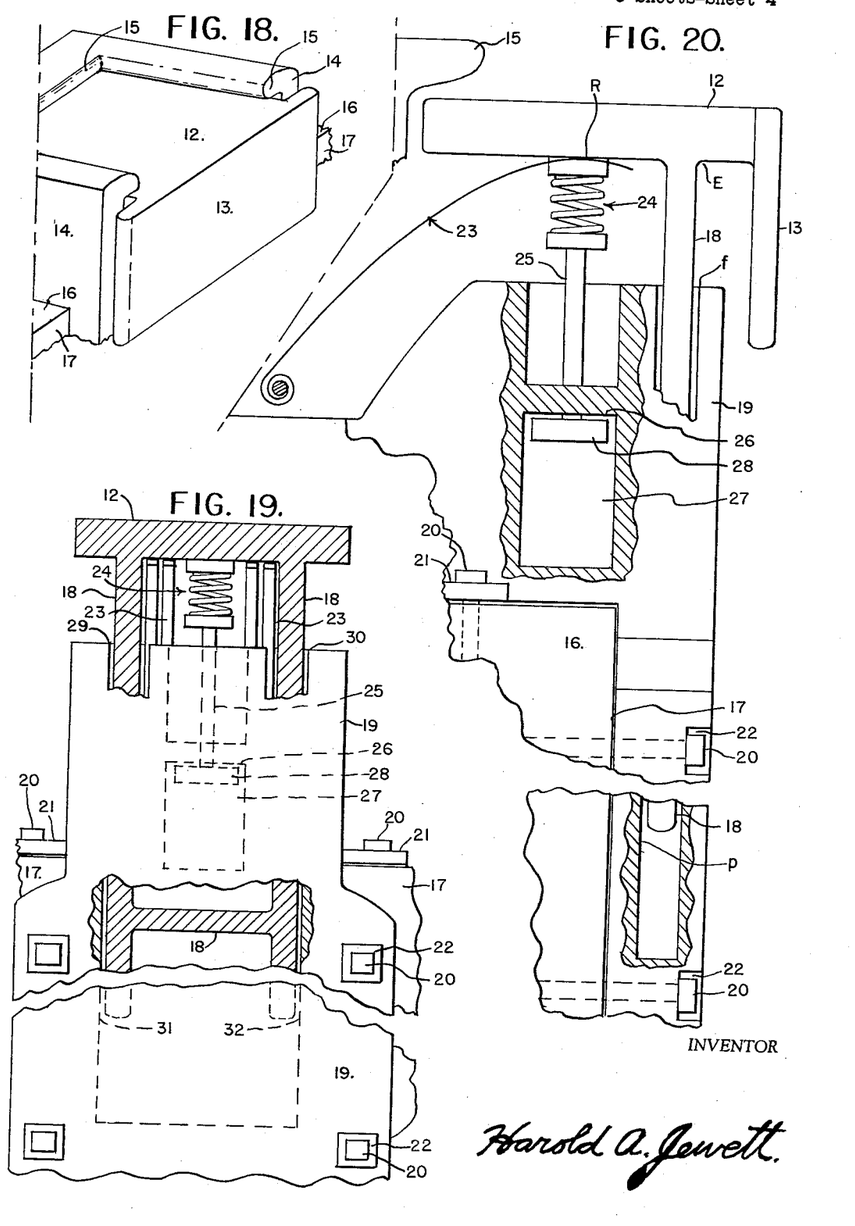
FIG. 18 is a perspective of the upper portion of an assembly embodying the species of FIG. 3.
FIG. 19 is a front elevation, with certain parts omitted and others in section, of an embodiment according to FIG. 18.
FIG. 20 is a side elevation on enlarged scale—again with certain parts omitted and others in section—of the embodiment of FIG. 19.
Figure 21:
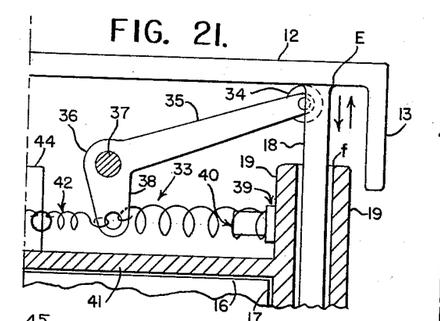
FIG. 21 is a side view detail of a portion of an alternative form of the embodiment of FIG. 19.

In FIGS. 18, 20 and 21 the board 12 is shown as carrying a guard 13 which shields the moving parts underlying the board. Additional shielding is provided by walls 14 and their overhanging portions 15, such walls resting on base 16 (which may be a dock, the shoulder of a pool, or the like) and extending downwardly alongside wall 17 of the base as shown in FIG. 18.

In FIGS. 19–21 and 24–25 vertically disposed equalizer framework 18 depends rigidly from board 12 into vertically disposed guide sleeve structure 19 which is securely affixed to said base 16 and its wall 17 by any suitable means, e.g., by bolts 20 passing through lugs 21 integrally extending from said sleeve structure, or through countersunk portions 22 thereof.

In FIGS. 19–20 the resilience is supplied by leaf springs 23 which may be mounted on base 16 in any suitable way. During movement of the board there will be a slip contact between the springs and the under side of the board but, as in the case of all slip contacts occurring in the practice of the invention, wear can be minimized and need for lubrication largely if not entirely obviated by affixing a lamina of anti-friction metal or material, e.g., nylon or the like, to the bearing surface, to receive the rub.

Back-lash motion of the board 12 is dampened in FIGS. 19–20 by the action of coil spring assembly 24 which is securely attached to the board at R. On down travel of the board, rod 25 of said assembly passes through a central aperture (understood) in ceiling 26 of recess 27 in housing structure (unnumbered) integral with and disposed immediately rearward of sleeve structure 19. While disc 28 which is integral with the lower end of rod 25 rides freely downward inside said recess during this motion, the disc impinges against and is stopped by said ceiling on the return motion, whereupon the coil spring acts in obvious manner to dampen back-lash of the board.

Figure 24:
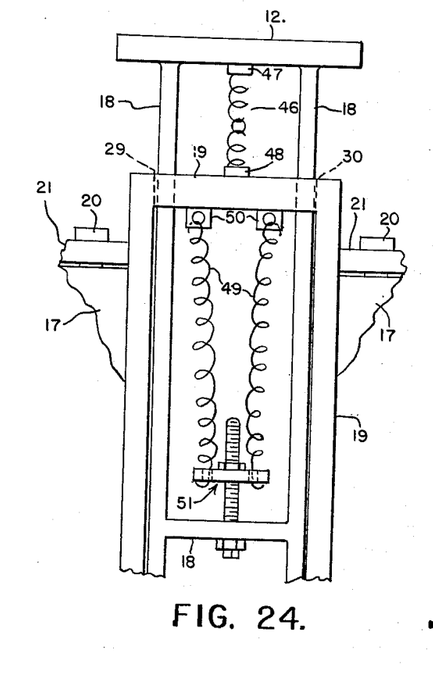
FIG. 24 is a front elevation of a portion of a further alternative form of the embodiment of FIG. 19.
Figure 25:
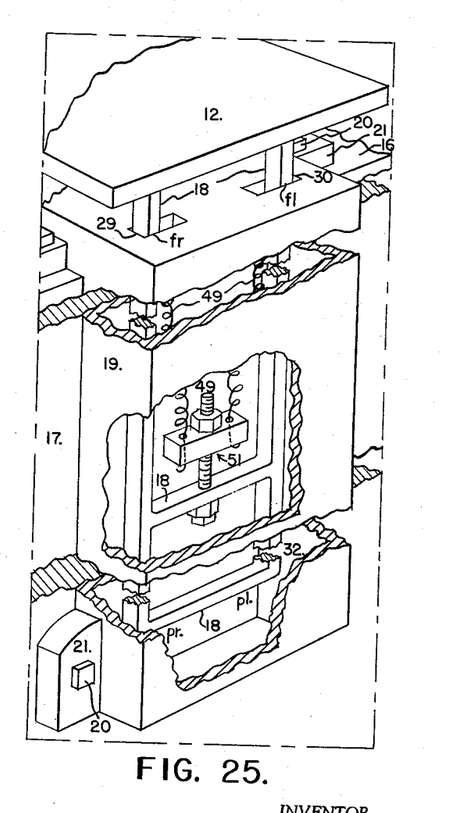
FIG. 25 is a perspective, on enlarged scale and with certain parts omitted and others broken away, of an embodiment generally similar to that of FIG. 24.

Front-to-rear drop of the board during use is approximately equalized, and rotatory play minimized, by the confining action of guide sleeve structure 19 on equalizer framework 18, due to contacts such as at $f$ and $p$ in FIG. 20 or $fr$, $fl$ and $pr$, $pl$ in FIG. 25. And side-to-side drop of the board is approximately equalized by analogous contacts such as at 29, 30, 31 and 32 in FIG. 19 (cf. also FIGS. 24–25).

In FIG. 21 resilience is supplied by a pair of horizontally disposed coil springs 33 (more fully shown in FIGS. 22–23) which become distended during down travel of the board 12 via pressure on roller 34 carried by arm 35 of bell crank lever 36, the latter being journaled on arbor 37 which is supported by housing walls (understood), and the lower arm 38 of the crank being engaged by said springs 33 in manner apparent from the drawings. Anchorage structures 39, which may include cylindrical alining lugs 40 (shown only in FIG. 21) extending axially within the springs, are securely annexed to sleeve structure 19. Frame member 41 projects rearwardly from the sleeve structure to seat on base 16. Back-lash is dampened by pairs of snubber springs 42 which, together with guide block 44, are more fully shown in FIGS. 22–23.

Figure 22:
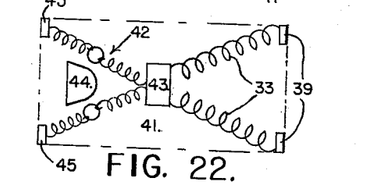
FIG. 22 is a plan view diagram of portions of FIG. 21 during non-use.
Figure 23:
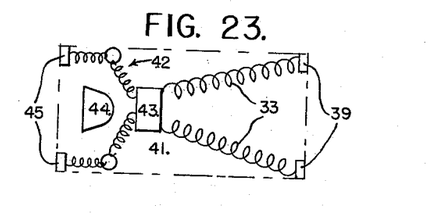
FIG. 23 is the same as FIG. 22 except during use.

In the latter figures, wherein rectangle 43 stands for said lower arm 38, guide block 44 rising from frame member 41 serves to make certain that each pair of snubber springs will buckle outwardly as depicted in FIG. 23, during distention of springs 33, and thus not become interentangled.

Each of the snubber springs 42 consists of a pair of coil springs optionally inter-connected by a ring about which the free end of each may be securely but slidably looped, so as to concentrate the buckling at the ring. The opposite ends of each pair of springs are respectively secured to anchorages 45 rising from frame member 41 and to said lower arm 38 (indicated by rectangle 43 as aforesaid), again optionally by loose-loop connections, so as to provide for free swinging of the individual springs between their FIG. 22 and FIG. 23 positions.

In the FIG. 24 embodiment use is again made of a pair of snubber springs 46 to dampen back-lash; but this time they are vertically disposed, being affixed to the under surface of the board 12 by anchorage 47 and to underlying frame structure (understood) by anchorage 48.

In FIG. 25 no particular type of back-lash dampener is shown, choice from among the types depicted herein or from the great variety of other types known to the shock absorbing and vibration or oscillation dampening arts being left to the user.

Resilience in both FIG. 24 and FIG. 25 is supplied by coil springs 49 which are suspended from sleeve structure 19 by anchorages 50 (cf. FIG. 24) and which serve to resiliently sustain equalizer framework 18 and board 12 via yoke assembly 51, the latter being rigidly united to said framework as shown, and said springs 49 being secured at their lower ends to said yoke assembly, also as shown.

In FIGS. 26–29, wherein the species of FIG. 4 is exemplified, optionally cylindrical equalizer stem 52 depending from the center of board 53 reciprocates in use through upper guide collar 54 and lower guide collar 55 (cf. FIG. 27) in housing structure 56, thereby being held to a substantially vertical course and consequently imparting substantially rectilinear motion to board 53. Resilience is supplied by coil springs 57 acting analogously to coil springs 49 of FIGS. 24–25, due to being affixed to stationary housing structure 56 at loci 58 and to yoke portion 59 of said stem 52.

In FIGS. 27–28 back-lash is dampened by a pair of coil spring assemblies 60, each of which is essentially identical with coil spring assembly 24 of FIGS. 19–20. The reason for using two of such assemblies in FIGS. 27–28 is that their rods 61, being laterally displaced from stem 52 and confined against rotatory movement about the axis of said stem by collars 62 (cf. FIG. 28) through which they reciprocate, serve to prevent rotatory motion of board 53 about its vertical axis.

In FIG. 29 said coil spring assemblies 60 are replaced by a dash-pot structure in which the enlarged portion 63 of stem 52 functions similarly to the piston of an ordinary dash-pot and the large air vents 64 and small air vents 65 respectively act similarly to the corresponding vents or air-holes of an ordinary dash-pot. In consequence, back-lash is minimized by the cushioning effect of air trapped between said portion 63 and the overlying portion of housing structure 56, once upward movement of stem 52 has carried said portion 63 past the large vents 64 and thus substantially excluded all avenues of escape for said trapped air save through small vents 65.

The above described anti-rotation function of rods 61 of FIG. 28 is served in FIG. 29 by rigid stems 66 depending from board 53 and being confined during their vertical reciprocation by wells 67 in said housing structure.

Not only in embodiments of the invention according to FIG. 4 (particularly exemplified in FIGS. 26–29) but also in those according to FIGS. 2–3 (particularly exemplified in FIGS. 18–25), the plunger type equalizer should be given sufficient length for its rubs against fulcrum $f$ and pivot $p$ to be relatively moderate.

As brought out in the parent cases, the fulcrum $f$ optionally may be above the board, since at least part of the equalizer may extend upwardly. But in any case, the effective length of the equalizer advantageously will be at least four, six—better eight, ten or even more—times said frontward radius. Also, the level of the highest rub point on fulcrum $f$ usually will be less than four or three—better, two—times the length of the frontward radius, below the upper surface of the board.

Especially since particular assemblies may happen to comprise boards fronting in more than one direction, but optionally in any embodiment according to FIGS. 2, 3 or 4, the width of the board may be substituted for said frontward radius in the aforesaid ratios. In such cases said width will mean the shortest dimension of the upper surface of the board that makes a ninety degree angle with one of its boundaries and passes through the point of intersection of said surface by the vertical axis of the equalizer.

To provide lateral stability, the structures comprising fulcrum $f$ and pivot $p$ will advantageously be fashioned so as to also provide for contacts such as 29–32 in FIG. 19, and at least the upper ones of such contacts will preferredly be respectively spaced from the vertical axis of the equalizer a distance at least equal to one-quarter or one-third—better, two-fifths or one-half—of said width.

Figure 30:
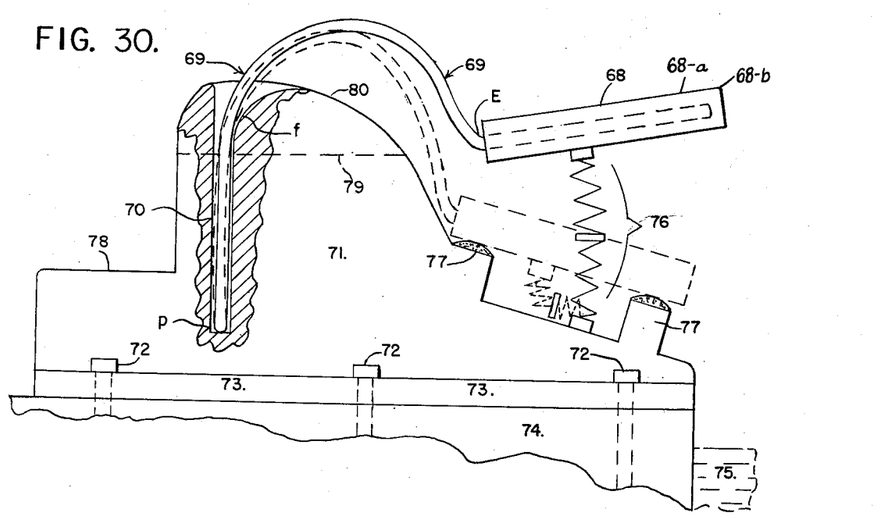
FIG. 30 is a side elevation, with certain parts broken away along line 30—30 of FIG. 31, of a form of the species of FIG. 5.
Figure 31:
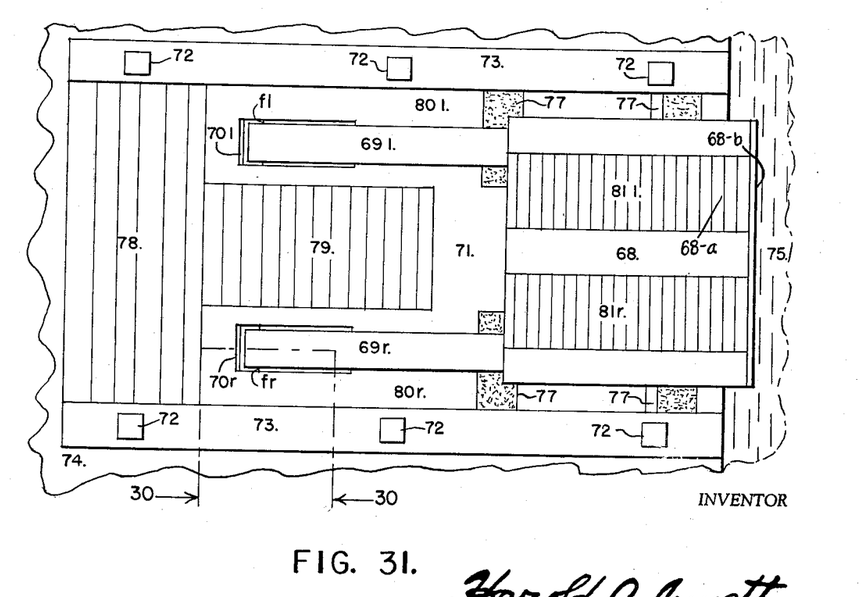
FIG. 31 is a plan of the embodiment of FIG. 30.

In FIGS. 30–31 board 68 having a take-off portion 68–a with an upper front boundary 68–b, and being upwardly elbowed at E and having shank portions 69 convoluted to extend vertically into and seat on the bottoms of guide sleeves 70, is mounted on portable block 71. Bolts 72 passing through flanges 73 of the block securely affix it to base 74 which borders water 75. Back-lash is minimized by a pair of snubber springs 76 acting similarly to snubber springs 46 of FIG. 24. Insurance against excessive down motion of said take-off portion 68–a of the board 68 is provided by stop portions 77 of block 71, the upper surfaces of which may be cushioned as indicated in the drawings.

As more clearly appears in FIG. 30, fulcrum $f$ is rounded to lessen wear; and the mouth of sleeve 70 is flared and extended upwardly to provide protection against injury to spectators who might unwittingly place their hands near the mouth of the sleeve during use of the board. As will be apparent from FIGURE 33, such protection can be provided to as great an extent as desired, via erection of appropriately proportioned guard or housing structure around all parts that conceivably could be sources of danger.

Approach to the board is facilitated by steps 78 and 79; said steps being created by bifurcation of the upper portion of block 71 to form side walls 80 in which the aforesaid sleeves 70 are sunk.

It will be noted that the board can be removed from the block merely by lifting shanks 69 out of their sleeves; or can be inserted or re-inserted merely by feeding them into said sleeves. Similarly, the take-off portion of the board can be made readily separable from said shanks 69 merely by providing for removal of the shanks from the recesses (unnumbered) with which they form bayonet joints such as those formed by shanks 84 with sleeves 83 of FIGS. 32–33 about to be described.

Approximately even distribution of the diver's weight will ordinarily be insured by provision of right and left tread portions or mats 81 (cf. FIG. 31).

It will be noted that the parts of the shank portions 69 of the board 68 which extend outwardly of $p$, i.e. which begin at $p$, happen to extend directly upward from it, though as appears in analytical FIG. 5 (FIG. 30 being a form of the species of FIG. 5 as above stated) they may e.g. extend frontwardly and then rearwardly, or as further appears in analytical FIGS. 6–8 (they, as above stated, being variations of said FIG. 5) may extend rearwardly at desired angles in the course of thus extending "outwardly of" $p$, or as appears in analytical FIGS. 10 and 12, may extend frontwardly at desired angles in the course of so doing. Also, the designating of said shank portions 69 as being of resilient material does not mean that they are not rigid; rather, it means that they are so rigid that when they bend in use—the bending being due to the board's acting as a unitary lever all the way from its said take-off portion to its anchor pivot $p$—they contribute desired spring force for the diver's take-off.

Comparison of the dash-line posture of the shank portions 69 of the board 68, on FIG. 30, with the solid-line posture thereof, will show that the bending of said shank portions is clockwise in relation to the fulcrum $f$, as viewed in right-side elevation. This sort of bending may be thought of as bow-type bending, in the sense of being antithetic to sag-type bending; the latter bending being such as occurs when a load is placed midway along a resilient beam that is supported only at its ends.

The aforesaid bow-type bending not only is exemplified in usual prior-art diving boards that bend in use as shown in FIG. 1–a, but also in all the bending-type boards of the invention, as will be clear from comparison of the dash-line postures of such boards or their resilient shank portions with their solid-line postures, as e.g. in FIGS. 5–10, and 12, as well as FIG. 30. The aforesaid sag-type bending finds exemplification e.g. in German Patent No. 1,032,140, the board therein not being within the contemplation of the expression, diving board, as used above or in the appended claims. That is to say, said expression is intended to be construed herein as limited not only to lever-type diving boards, as already brought out, but in the case of boards which bend in use, to those whose spring force derives from bow-type bending such as aforesaid, as distinguished from said sag-type bending.

Figure 32:
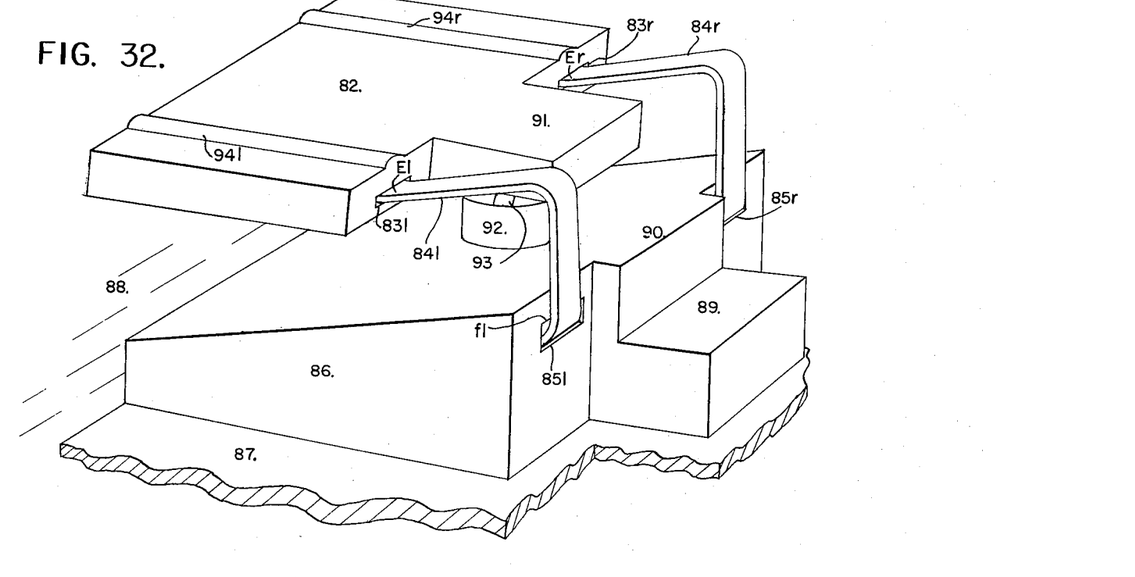
FIG. 32 is a perspective of an assembly embodying the species of FIG. 7.
Figure 33:
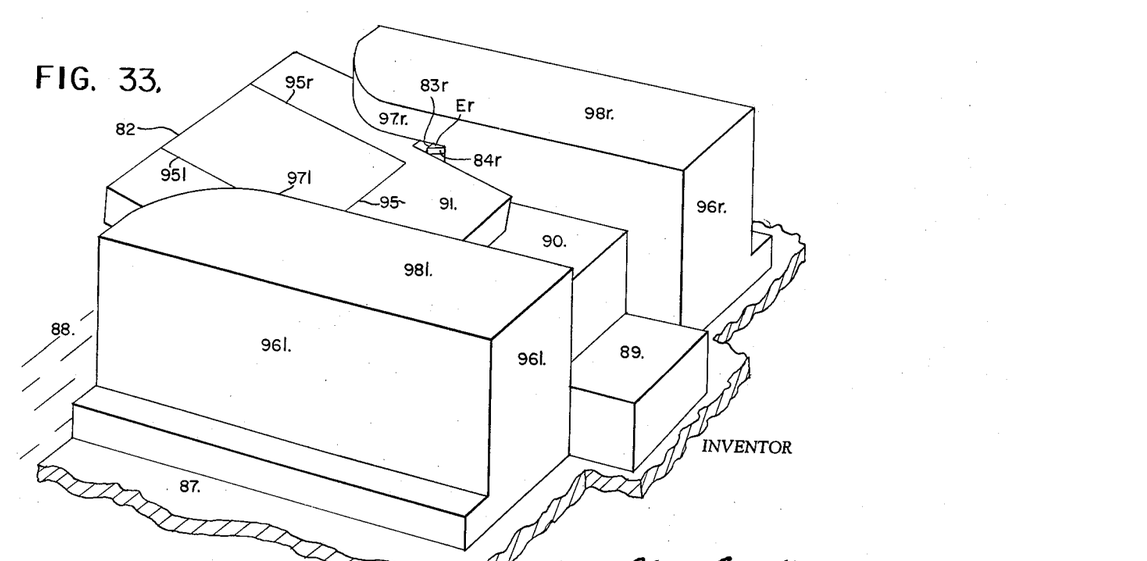
FIG. 33 is the same as FIG. 32 except for minor differences in design plus the addition of protective housing structure.

In FIGS. 32–33 board 82 is provided with sleeves 83 into which shanks 84 reach, to form rigid bayonet joints. Security of affixation is provided in any desired way, e.g. by bolting from the under side of the board or cementing or welding in the mouths of the sleeves. Shanks 84, though elbowing slightly upwardly from said mouths at E, are convoluted downwardly and then slopingly forward as shown in FIG. 32 to extend into guide sleeves 85 which provide fulcrums $fl$ (cf. FIG. 32) and $fr$ (understood) as well as pivots (understood) internally of block 86, said pivots corresponding to anchorage pivots $p$ of FIG. 7.

The block 86 is fixed in any suitable way on base 87 which borders on water 88. Steps 89 and 90 provide an approach to rearward portion 91 of the board.

Guard collar 92 (cf. FIG. 32) encircles a back-lash dampener of any desired type, the same being schematically depicted by tube 93. A positive limit on the extent of down travel of the board can be provided, if desired, by special stop structures such as 77 of FIGS. 30–31. Substantial insurance that the diver's stance will be well centered on the take-off portion of the board can be provided by raised portions 94, as in FIG. 32, or merely by lines 95, as in FIG. 33.

In the latter figure walls 96 not only house shanks 84 and block 86 (cf. FIG. 32) but also have frontward projections 97 that protectively overlie the portions of shanks 84 that extend rearwardly from sleeves 83 and elbows E.

It will be noted that roofs 98 may serve as seats.

Figures 34, 35, 36:
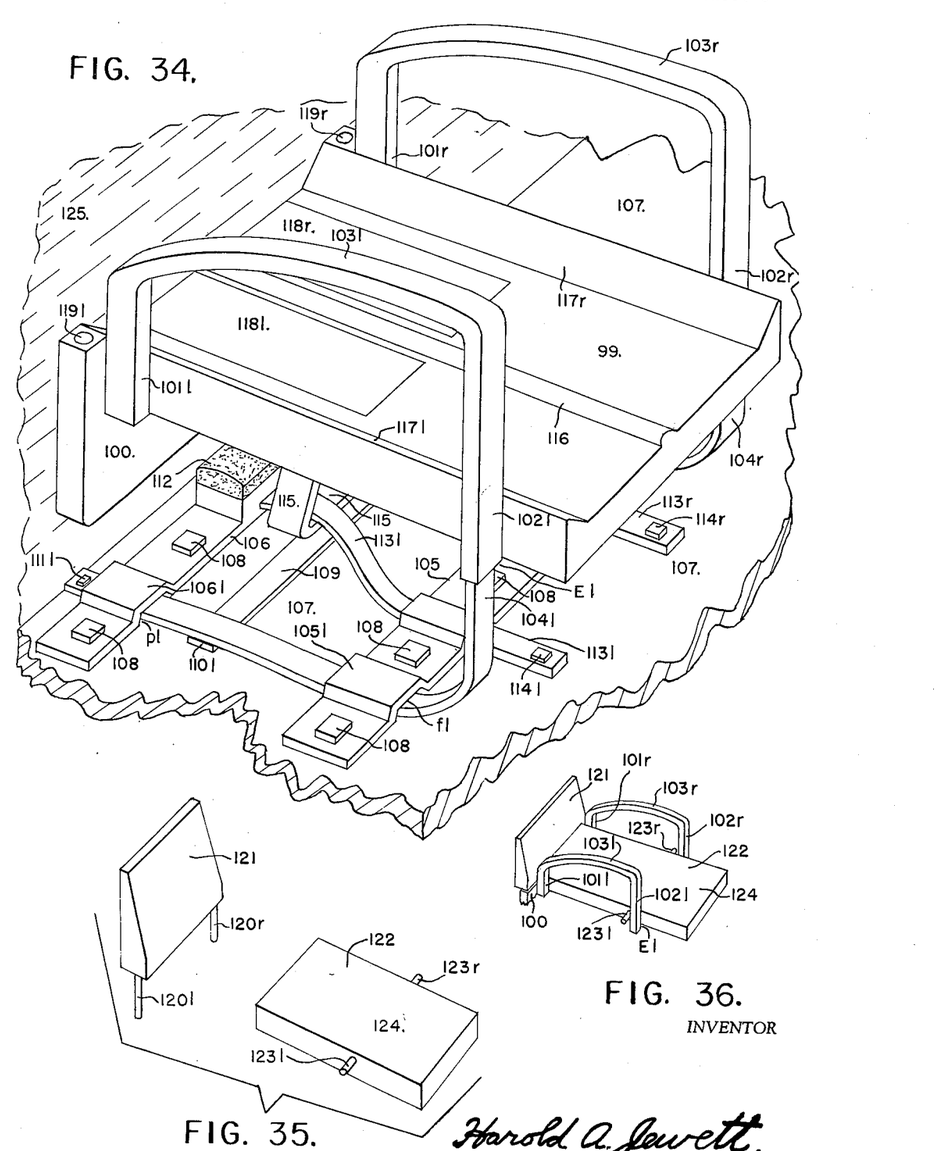
FIG. 34 is a perspective of an embodiment of the species of FIG. 8.
FIG. 35 is an exploded group of two accessories in perspective, combinedly usable with the FIG. 34 embodiment.
FIG. 36 is a perspective of the two accessories of FIG. 35 combined in position of use.

In FIG. 34 board 99 carries shield 100 and is securely united, e.g. by welding, to upright portions 101, 102 of rigid arms 103. Shanks 104 over which said portions 102 are removably sleeved, form rigid elbows E with the board and then are further convoluted to extend under clamps 105 and 106, said clamps being securely affixed to base 107 as e.g. by bolts 108. The horizontal portions of said shanks between the clamps may be bowed upwardly as desired, as well as optionally cross-tied by rigid structure such as bar 109, the latter clearingly overlying base 107 and being rigidly united to said bowed portions as by welding at 110. The frontward ends of said shanks may be secured to base 107 as by bolts 111.

It will be noted that when the horizontal portions of said shanks 104 are bowed upwardly as aforesaid, said shanks will comprise not only pre-fulcrum elbows but also post-fulcrum elbows, and that bending during use will occur not only in pre-fulcrum portions of said shanks 104 but also in post-fulcrum portions thereof. Since FIG. 34, as already explained hereinabove, is an embodiment of the species of FIG. 8, reference to the dash lines outline of shank portion 5 on FIG. 8 will furnish visualization of such bending. In fact, such visualization likewise occurs in each of FIGS. 5–7, 9–10 and 12, all of which are inter-related as hereinbefore brought out.

Stop structure 112, optionally integral with clamp 106, serves to positively limit down motion of the board; while leaf-springs 113, secured to the base as by bolts 114 and overlying portions (unnumbered) of clamp 105, serve to dampen back-lash by resiliently engaging hook member 115 carried by board 99, at the instant the latter re-attains its initial level during up motion following a diver's take-off.

Good centering of the diver's weight during use is substantially insured by the board's raised portions 116, 117 and tread portions 118.

Sockets 119 in shield 100 are for the reception of pegs 120 of portable chair back 121, shown in FIGS. 35–36.

In the latter figures a portable chair seat 122, optionally of chaise-lounge proportions, is provided with lugs 123 which, when the seat is placed on board 99 and its end portion 124 fed rearwardly between upright portions 102 of arms 103, come into engagement with said portions 102 as shown in FIG. 36. Feeding of pegs 120 into sockets 119 thereupon places chair back 121 into position to serve as the back for the chair of FIG. 36.

To reconvert the chair to a diving board, it is only necessary to lift the back 121 out of place and then withdraw the seat 122.

It will be noted that whereas the diving board 99 of FIG. 34 faces the water 125, said chair faces directly away from it. Use of a swivelled auxiliary base for the whole assembly however, plus means for locking it to the main base at any desired angle in relation to the water, can readily be made, so as to provide freedom of choice in regard to said angle.

In FIG. 37 board 126 has rigid elbow connections to upwardly extending shank portions 127 which are securely affixed to and suspended from convolute leaf-springs 128 via bayonet jointing in sleeves 129 in the same manner as above described in regard to shanks 84 and sleeves 83 of FIG. 32. Side walls 130 fixed to base 131 are provided with forwardly extending guide sleeves 132 into which the lower portions of said leaf-springs 128 reach, the frontward ends of said portions being securely based on elevated portions of said walls 130 via bolts 133.

During use of the board shank portions 127 reciprocate alongside of and between fixed walls 130, the latter serving, if needed, as positive guards against undue side-to-side tilting of the board and its shank portions 127.

Back-lash is dampened by snubber springs assembly 134, which may be similar to the pair of snubber springs 76 of FIG. 30.

The forward component of propulsion achieved by the FIG. 37 type of construction has already been discussed in connection with FIG. 9.

As in the case of the other drawings herein, if broken away, omitted or concealed portions of FIG. 37 were filled in or particularly shown, the overall assembly would be symmetrical in relation to the center plane.

In FIG. 38 board 135, rigidly elbowed at E, comprises upwardly extending shank 136, cylindrical aperture 137 of which is rotatably journaled on arbor 138 which is supported at its ends by side walls 139 into apertures (understood) in which said ends are snugly fitted. In this arrangement the upper surface of the arbor constitutes the board's fulcrum $f$ while the lower surface of the arbor constitutes its anchorage pivot $p$. Were aperture 137 to be replaced by a spindle integral with said shank, and arbor 138 by a fixed cylindrical bearing sleeve within which the spindle turned on movement of the board in use, fulcrum $f$ would be the lower portion of said sleeve and anchorage pivot $p$ its upper portion. In other words, the reversal of parts thus effected would place $p$ above $f$ as in FIG. 13, instead of below it as in FIG. 38.

Resilience in the latter figure is supplied e.g. by centrally placed leaf-spring 140 which is securely fixed in portable block 141, the latter being affixed to base 142, as by bolts 143 passing through flanges 144. Optionally no back-lash dampening means need be supplied, unless perhaps such as constituted by cushioned stop structure 145 immediately overlying rearward portion 146 of the board. Down motion of the latter is positively limited by stop structure 147 affixed on said block 141, there being a central channel (understood) in the upper portion of said stop structure 147 the bottom of which channel is indicated by dash line 148, to receive spring 140 in case board 135 should swing downwardly enough to impinge against said stop structure 147. Use of anti-friction surfacing at the bearing interface between spring 140 and board 135 can be availed of. Or, if desired, a roller can be installed on said spring to bear upwardly against the under surface of the board 135.

Flaring of stop structure 145 forwardly and upwardly as at 149 serves to minimize risk of injury.

It is contemplated that with spring 140 (or a gang of springs replacing it) made relatively weak, the assembly of FIG. 38 will be particularly adaptable to use by children; also that the board will be approached either by stepping up from a portion of the base 142 at the side of the board, or down from the roof 150 of the portion of block 141 which, as is apparent from the drawing, houses the portions of the assembly which underlie it.

Predetermination of the resilience characteristics of the diving boards of the invention can be effected by invocation of known principles of spring design, having regard to the particular material of which the spring members are to be made, e.g., the shanks 5 of embodiments according to FIGS. 5–12 can be given varying cross-sectional dimensions and shapes along their lengths, such that if fashioned from corrosion-resistant tempered steel (e.g. "bonderized" spring steel) the behavior characteristics of the drop of the take-off portion of the board under the weight of an average diver will closely approximate those of a conventional board.

Referring again to FIGS. 10–11, it may be remarked that their shanks 5 might be further convoluted several times in axial or lineal succession, before entering the mouths 7 of their sleeves 6; also that each convolution might be considerably smaller and/or of less height than the one appearing in FIG. 10. But to so vary the species of FIGS. 10–11 would yield a presently less preferred form of the invention than those embodiments in which the shanks are so convoluted as to require their sleeves 6 to extend downwardly and/or frontwardly, rather than rearwardly of the fulcrum. In either case, however, the result of the convoluting is to impart to the longitudinal axis of the board, intermediately of its take-off portion and its fulcrum, a serpentine course that lies in a vertical plane which advantageously will be the center plane of the board.

It may be observed at this point that sleeves 6 of FIGS. 2–12 can be likened to or fashioned in the manner of stirrups, so as to facilitate placement of the diving board into its position of use, or removing it therefrom, merely by feeding the remote ends of the shanks 5 into or withdrawing them from the stirrups. And the latter can of course be comprised either in a portable block such as 71 of FIGS. 30–31 or 86 of FIG. 32, or in an integral portion of base 2 itself.

In the embodiments depicted in FIGS. 6–9, 32–34 and 37 the pressure of the shanks against the fulcrums $f$ during the diver's take-off has been uniformly shown as upward. This is because the normal centering of the diver's weight at the take-off, in each of those embodiments, is frontwardly of the anchor pivots $p$. If it were not, the pressure at $f$ would be downward. But in the latter case the assembly would represent a non-preferred form of the invention, since a certain amount of protrusion frontwardly of the anchor pivot, or out over the water too, is desirable from the standpoint of maximum safety in the use of the board.

Referring again to FIGS. 21–23, it will be appreciated that cooperating pairs of coil springs such as 33 and 42 and their associated parts could optionally be arranged in vertical disposition, so that with bell crank lever 36 replaced by a lever of suitable proportions and mounting, down motion of the board 12 would exert a more upward pull (optionally a vertical pull) on said springs 33.

In situations where mutually co-operating pairs of coil springs are used, as e.g. in FIGS. 21–25 and 27–29 and whether for supplying resilience to the board or for dampening its back-lash, the individual members of the pairs will advantageously be mutually reversely coiled, so that the tendency of one to twist about its axis during distension will be counteracted by the corresponding tendency of the other.

Unless otherwise evident from the context, all statements herein and in claims appended hereto, relative to placement and dimensioning of parts, will have reference to the situation where such parts are at rest and the board or corresponding part is in its up position.

Novel subject matter disclosed but not claimed herein is being claimed in continuational applications S.N. 755,680, filed August 18, 1958, and S.N. 192,237, filed May 3, 1962.

It will be apparent that many changes in the physical embodiments of the invention and its novel aspects may be made within the scope of the appended claims without departing from the spirit of the invention.

I claim:

1. A diving board assembly adapted to be mounted adjacent to a body of water,
   (a) the assembly comprising a diving board having a take-off portion with an upper front boundary,
   (b) means furnishing an anchor pivot for said board and preventing sidewise and twisting motion of said take-off portion during use,
   (c) said board having a longitudinal axis extending from said take-off portion approximately to said anchor pivot,
   (d) said board having a shank portion which is of resilient material at least in that part which extends outwardly of said pivot,
   (e) said shank portion including an elbow disposed in said longitudinal axis and introducing an upright component of direction into that segment of said longitudinal axis which begins at said elbow and ends at said anchor pivot, and
   (f) said segment intersecting an imaginary sloping plane which passes through said boundary and forms a dihedral angle of at least 5° with an imaginary horizontal plane which also passes through said boundary.

2. The assembly of claim 1
   (g) which comprises means furnishing a fulcrum for said board at an intermediate location along said longitudinal axis, the board consequently acting as a resiliently bending lever in response to the weight of a diver on said take-off portion during use,
   (h) the bending occurring in said resilient material and being clockwise in relation to said fulcrum, as viewed in right-side elevation.

3. The assembly of claim 2 wherein said component of direction is downward and said angle is at least 10°.

4. The assembly of claim 2
   (i) wherein said board is disposed to rest loosely on said fulcrum, lengthwise reciprocatory slip by the board across said fulcrum consequently occurring, incident to said bending.

5. The assembly of claim 2 wherein said component of direction is downward and said angle is at least 15°.

6. The assembly of claim 2
   (j) wherein said shank portion is furcate.

7. The assembly of claim 2
   (k) wherein said resilient material comprises spring metal.

8. The assembly of claim 2 wherein said resilient material comprises fiber glass.

9. The assembly of claim 2 wherein said resilient material comprises synthetic resin.

10. The assembly of claim 4 wherein said resilient material comprises spring steel.

11. The assembly of claim 2
    (l) wherein said shank portion comprises a leaf spring which is in rigid union with a posterior portion of said board and constitutes an integral part thereof.
    (m) said shank portion, in extending outwardly of said pivot, concomitantly extending upwardly thereof, and said dihedral angle being at least 10°.

12. The assembly of claim 11
(n) wherein said spring extends upwardly from said posterior portion, thereby intersecting at a locus outwardly of said pivot, an imaginary sloping plane which passes through said boundary and forms an upward dihedral angle of at least 5° with said horizontal plane.

13. The assembly of claim 11 wherein said spring is of metal.

14. The assembly of claim 11 wherein said spring is furcate.

15. The assembly of claim 12 wherein said spring is of steel.

16. The assembly of claim 12 wherein said spring is furcate.

17. The assembly of claim 11
(o) which comprises frontward fastening means and rearward fastening means for said spring,
(p) said frontward fastening means providing said pivot,
(q) said rearward fastening means providing said fulcrum,
(r) and said spring, in extending outwardly of said pivot, concomitantly extending rearwardly thereof to said fulcrum,
(s) said fulcrum and said pivot being mutually spaced apart, thereby permitting bending of said spring during use, at loci intermediate said pivot and said fulcrum.

18. The combination of claim 17
(t) which comprises shock-absorbing means for dampening back-lash of said board.

19. The combination of claim 18 wherein said spring is furcate.

20. The combination of claim 19
(u) wherein said spring extends upwardly from said fulcrum to said posterior portion.

References Cited in the file of this patent

UNITED STATES PATENTS

| | | |
|---|---|---|
| 2,024,028 | Dahlberg | Dec. 10, 1935 |
| 2,068,386 | Otis | Jan. 19, 1937 |
| 2,251,766 | Stark | Aug. 5, 1941 |
| 2,461,086 | Schumacher | Feb. 8, 1949 |
| 2,645,483 | Smith | July 14, 1953 |
| 2,649,304 | Ulanovsky | Aug. 18, 1953 |
| 2,675,235 | Nightingale | Apr. 13, 1954 |
| 2,675,728 | Jewett | Apr. 20, 1954 |
| 2,675,729 | Jewett | Apr. 20, 1954 |
| 2,701,881 | McGee | Feb. 15, 1955 |
| 2,743,926 | Klein | May 1, 1956 |

FOREIGN PATENTS

| | | |
|---|---|---|
| 104,721 | Sweden | 1942 |